United States Patent [19]

Klemarczyk et al.

[11] Patent Number: 5,539,012

[45] Date of Patent: Jul. 23, 1996

[54] FIBER/RESIN COMPOSITES AND METHOD OF PREPARATION

[75] Inventors: Philip T. Klemarczyk, Collinsville; Yoshihisa Okamoto, Avon, both of Conn.

[73] Assignee: Loctite Corporation, Hartford, Conn.

[21] Appl. No.: 108,437

[22] Filed: Aug. 18, 1993

[51] Int. Cl.$^6$ .............................. C08F 2/50; C08L 63/00
[52] U.S. Cl. .............................. 522/13; 522/20; 522/24; 522/26; 522/29; 522/40; 522/41; 522/42; 522/43; 522/44; 522/46; 522/48; 522/60; 522/68; 522/170; 522/173; 522/182; 428/34.5; 428/34.7; 428/36.1
[58] Field of Search .............................. 522/13, 170, 24, 522/182, 20, 26, 29, 40, 41, 42, 43, 44, 46, 48, 60, 68, 173

[56] References Cited

U.S. PATENT DOCUMENTS

| | | | |
|---|---|---|---|
| Re. 27,973 | 4/1974 | Pennington et al. | 156/175 |
| 3,224,317 | 12/1965 | Gould | 86/1 |
| 3,226,358 | 12/1965 | Smith et al. | 260/49.95 |
| 3,246,054 | 4/1966 | Guenther et al. | 264/22 |
| 3,293,860 | 12/1966 | Stedfeld | 60/263 |
| 3,316,842 | 5/1967 | Schulz | 102/100 |
| 3,353,987 | 11/1967 | Manaka et al. | 117/47 |
| 3,403,199 | 9/1968 | Ramos | 260/830 |
| 3,408,422 | 10/1968 | May | 260/837 |
| 3,441,543 | 4/1969 | Heilman | 260/78.5 |
| 3,450,613 | 6/1969 | Steinberg | 204/159.15 |
| 3,488,404 | 1/1970 | Parker | 260/830 |
| 3,616,070 | 10/1971 | Lemelson | 156/446 |
| 3,660,144 | 5/1972 | Johnson et al. | 117/93.31 |
| 3,660,145 | 5/1972 | Johnson et al. | 117/93.31 |
| 3,660,371 | 5/1972 | Johnson et al. | 117/93.31 |
| 3,678,131 | 7/1972 | Klapprott et al. | 260/837 R |
| 3,772,062 | 11/1973 | Shur et al. | 117/93.31 |
| 3,804,735 | 4/1974 | Radlove et al. | 204/159.23 |
| 3,844,916 | 10/1974 | Gaske | 204/159.16 |
| 3,847,770 | 11/1974 | Radlowe et al. | 204/159.23 |
| 3,878,019 | 4/1975 | Chapman et al. | 156/272 |
| 3,922,426 | 11/1975 | Feltzin | 428/295 |
| 3,925,349 | 12/1975 | Gaske | 204/159.15 |
| 3,929,545 | 12/1975 | Van Dyck et al. | 156/220 |
| 3,935,330 | 1/1976 | Smith et al. | 427/41 |
| 3,937,855 | 2/1976 | Gruenwald | 427/54 |
| 3,962,184 | 6/1976 | Notomi et al. | 260/47 CP |
| 3,982,185 | 9/1976 | Shinn et al. | 339/144 R |
| 3,983,289 | 9/1976 | Nishizaki et al. | 428/268 |
| 3,989,610 | 11/1976 | Tsukada et al. | 204/159.15 |
| 4,012,267 | 3/1977 | Klein | 156/178 |
| 4,012,553 | 3/1977 | Clemens | 428/285 |
| 4,017,453 | 4/1977 | Heilman et al. | 260/42.18 |
| 4,018,333 | 4/1977 | Blackwood | 206/343 |
| 4,025,407 | 5/1977 | Chang et al. | 204/159.14 |
| 4,025,578 | 5/1977 | Siebert | 260/837 R |
| 4,028,204 | 6/1977 | Rosen et al. | 204/159.14 |
| 4,054,029 | 10/1977 | Sayles | 60/253 |
| 4,055,541 | 10/1977 | Riew | 260/47 EN |
| 4,073,835 | 2/1978 | Otsuki et al. | 264/22 |
| 4,088,633 | 5/1978 | Gurney | 260/47 EN |
| 4,092,443 | 5/1978 | Green | 427/53 |
| 4,117,361 | 9/1978 | Smith et al. | 310/208 |
| 4,170,505 | 10/1979 | Zgraggen | 156/162 |

(List continued on next page.)

FOREIGN PATENT DOCUMENTS

| | | |
|---|---|---|
| 0266986A2 | 5/1988 | European Pat. Off. . |
| 03476800A2 | 12/1989 | European Pat. Off. . |
| 0403170A3 | 12/1990 | European Pat. Off. . |
| 2421619 | 11/1975 | Germany . |
| 1508951 | 4/1978 | United Kingdom . |
| 1522441 | 8/1978 | United Kingdom . |
| 2003896 | 3/1979 | United Kingdom . |
| 1570992 | 7/1980 | United Kingdom . |
| 1570991 | 7/1980 | United Kingdom . |
| 1575361 | 9/1980 | United Kingdom . |
| 1591324 | 6/1981 | United Kingdom . |
| WO92/03516 | 3/1992 | WIPO . |

OTHER PUBLICATIONS

Horn et al., "Ultraviolet Curing Polyester Preimpregnated Materials for Vacuum Bag Laminates and Filament Winding", pp. 1–4.

Ising et al., "Cyanate Cure Behavior and the Effect on Physical and Performance Properties", 3rd International SAMPE Electronics Conference, pp. 360–370 (1989).

Anonymous, Research Disclosure, "Uncured Resin Mixture of Cyanate Ester Resin and Epoxy Resin Modified with Particulate Elastomer and Polymeric Material Prepared Therefrom", pp. 431–437, Jun. 1991.

Shimp et al., "Cyanate Ester—Cured Epoxy Resin Structural Composites", 37th International SAMPE Symposium, pp. 293–305 (1992).

Rhodes, "Advances in Anhydride Epoxy Systems", Anhydrides & Chemicals, Inc., pp. 2–11, Oct. 1991.

Penn et al, "Epoxy Resins", Ch. 5 in *Handbook of Composites*, G. Lubin, ed., Van Nostrand Reinhold Co., pp. 57–88 (1982).

*Primary Examiner*—Susan W. Berman
*Attorney, Agent, or Firm*—Hoffmann & Baron

[57] ABSTRACT

Resin compositions useful for filament winding applications comprising an epoxy component including at least one polyepoxide resin curable by heat, an olefinicially unsaturated monomer component including at least one polyolefinically unsaturated monomer curable by actinic radiation, a cyanate ester component including at least one cyanate ester compound having at least two cyanate functional groups per molecule, at least one organic peroxide, at least one photoinitiator, and a heat activated curing agent for epoxies. The compositions have a viscosity less than about 2000 centipoise (cps) and are capable of retaining this viscosity for at least about 6 months at about ambient temperature. The resins are capable of being immobilized by actinic radiation exposure and further heat cured without substantial resin drip. One or more organic peroxides are employed, selected from the group of organic peroxides having 10 hour decomposition half-lives at temperatures of from about 50° C. to less than about 104° C. Also, fiber resin composites comprising fiber substrates impregnated with the dual-curing resin compositions. Also the process for coating fiber substrates with the dual-curing resin compositions is disclosed.

30 Claims, No Drawings

U.S. PATENT DOCUMENTS

| | | | |
|---|---|---|---|
| 4,218,279 | 8/1980 | Green | 156/272 |
| 4,220,513 | 9/1980 | Green et al. | 204/159.23 |
| 4,230,766 | 10/1980 | Gaussens et al. | 428/288 |
| 4,239,077 | 12/1980 | Dixon et al. | 156/252 |
| 4,252,592 | 2/1981 | Green | 156/272 |
| 4,252,593 | 2/1981 | Green | 156/231 |
| 4,254,012 | 3/1981 | Green | 260/42.18 |
| 4,276,352 | 6/1981 | Green | 428/473.5 |
| 4,282,353 | 8/1981 | Green | 542/438 |
| 4,308,367 | 12/1981 | Green et al. | 525/529 |
| 4,339,567 | 7/1982 | Green et al. | 528/102 |
| 4,358,477 | 11/1982 | Noomen et al. | 427/54.1 |
| 4,368,253 | 1/1983 | Green et al. | 430/326 |
| 4,383,025 | 5/1983 | Green et al. | 430/280 |
| 4,398,014 | 8/1983 | Green et al. | 528/89 |
| 4,412,048 | 10/1983 | Dixon et al. | 525/524 |
| 4,413,052 | 11/1983 | Green et al. | 430/327 |
| 4,416,975 | 11/1983 | Green et al. | 430/327 |
| 4,439,291 | 3/1984 | Irving et al. | 204/159.23 |
| 4,447,586 | 5/1984 | Shimp | 525/504 |
| 4,479,984 | 10/1984 | Levy et al. | 427/54.1 |
| 4,515,737 | 5/1985 | Karino et al. | 264/22 |
| 4,546,131 | 10/1985 | Hefner, Jr. | 523/466 |
| 4,552,604 | 11/1985 | Green | 156/246 |
| 4,559,339 | 12/1985 | Hefner, Jr. | 528/120 |
| 4,611,022 | 9/1986 | Hefner, Jr. | 524/325 |
| 4,654,097 | 3/1987 | Sauvage | 156/172 |
| 4,666,954 | 5/1987 | Forgo et al. | 522/83 |
| 4,684,567 | 8/1987 | Okamoto et al. | 428/250 |
| 4,775,736 | 10/1988 | Wiggins | 528/91 |
| 4,892,764 | 1/1990 | Drain et al. | 428/34.5 |
| 5,011,721 | 4/1991 | Decker et al. | 428/36.9 |
| 5,137,936 | 8/1992 | Akiguchi et al. | 522/170 |

FIBER/RESIN COMPOSITES AND METHOD OF PREPARATION

BACKGROUND OF THE INVENTION

1. Field of the Invention

The present invention relates generally to fiber/resin composites and to methods of making such composites. In a specific aspect, the present invention relates to resin articles comprising arrays of continuous filaments, such as are formed by filament winding, prepregs and the like.

2. Description of the Related Art

In the field of composite materials, a variety of fabrication methods and techniques have come into usage for producing fiber-reinforced resin matrix materials. Continuous filament processes have evolved which are adapted to automated production of filament-reinforced resin articles. The continuous fiber processes include filament winding, wherein the filament, in the form of discrete strands or roving, is coated with a resin, then wound on a mandrel at a predetermined angle and winding thickness to yield composite articles having high strength when the resin borne on the filament is cured.

In order to have commercial utility the polymeric resins employed in filament winding operations must exhibit low initial viscosity and long pot-life in the process systems in which they are employed. Low viscosity is required in order that deposition of the resin on the filament be highly uniform in character, as is required to achieve substantially uniform properties in the final product article. If viscosity changes appreciably during the filament winding operation, the applied resin thickness may change significantly, resulting in localized stresses or discontinuities in the final product article, product articles which are not within required dimensional tolerance specifications, and inadequate curing of the resin. In addition, the tensional forces on the resin impregnated filaments being processed will significantly increase as the resin viscosity increases, to such extent that the filament becomes highly susceptible to snapping, i.e., tensionally breaking.

Long pot-life of the resin is particularly necessary in filament winding operations where processing times may be on the order of hours. Since the resin is continuously being applied to the filament in these processes, the resin bath or other source of the resin must be continually replenished with resin coating material, and it is therefore necessary that the resin not "set up" or gel in the source bath or other source container and applicating means.

For example, in the fabrication of rocket motors, a resin-bearing filament is wound onto a solid rocket fuel body. In such applications, since the filament winding operation may take upwards of 6 hours and since viscosity must be substantially stable during this period, a long resin pot-life is essential, and consequently the filament wound body must be rotated until full cure of the resin is achieved, which in the case of conventional epoxy resins can range from hours (for heat cured resins) to days (for resins cured at ambient temperatures). Continuous rotation of the mandrel and filament winding is essential in such cases, since cessation of rotation would result in the viscous resin sagging and dripping under gravitational forces, resulting in a resin-rich lower portion of the product article and a resin-poor upper portion of the product. Accordingly, it is desirable to cure the fiber array quickly once it has been formed.

The difficulties inherent in balancing the properties of long pot-life and a quick and easily controlled cure have resulted in the development of numerous types of resins. And within each class of resin, attempts have been made to vary the conditions under which the resins will cure effectively. The standard resins which have been employed in continuous filament processes, as well as in other systems of fiber/resin composite manufacture, generally have deficiencies which have specifically limited their utility in these processes.

The epoxy resins form an extremely important and versatile class of resins. These resins exhibit excellent resistance to chemicals, will adhere to glass and a variety of other materials, show electrical insulation properties, and are relatively easy to use. Among the epoxy resins, systems employing epoxy compounds in conjunction with olefinically unsaturated compounds have found wide acceptance in the art. In particular, resins comprising epoxies and acrylates have been found to be especially useful. This class of resins includes blends of epoxies and acrylates ("epoxy/acrylate" resins) as well as compositions wherein the principal resin component is an acrylic acid-modified epoxy in which some or all of the epoxy groups have been consumed to produce unsaturated resins. Partially acrylated epoxies are occasionally identified as "dual-functional" compounds since they are designed to exhibit both epoxy and acrylate functional groups on the same molecule.

Within the aforementioned class of epoxy/acrylate systems, compositions have been generated which are adapted to various cure conditions. Such compositions have employed heat curing mechanisms, actinic radiation curing mechanisms, or a combination of both.

Heat curing alone has several disadvantages including reducing the viscosity of the resin, causing it to become more fluid and thereby making it more difficult to handle the article, as well as more difficult to achieve a product of isotropic character. In applications such as filament winding, this drop in viscosity results in resin drip, as previously mentioned. Yet heat curing of epoxy/acrylate systems is an effective and practical means of curing the resins to the fully hardened state that is the source of the resins' great utility.

The use of actinic radiation to cure or partially cure, i.e., gel the resin, can substantially increase the viscosity of the resin on the formed article. Actinic radiation generally cannot induce complete hardening of the resin and such systems usually employ a catalyst and/or a heat cure step to fully cure the resins.

The class of epoxy/acrylate resin systems includes an especially useful subclass of resin systems which include, as an additional polymerizing component, a cyanate ester resin. Traditionally, cyanate ester resin compositions have employed thermosettable cyanate resins in combination with epoxies, acrylates and a variety of heat activated catalytic agents. Cyanate ester resin compositions have been found to be useful in applications ranging from castings and laminates to filament winding operations.

The following patents illustrate the state of the art of cyanate ester resin compositions. As a general rule, all cyanate ester resin compositions employ organic compounds having at least one cyanate ester functionality. These resin compositions are generally curable by heat and, as a result, include thermally activated catalytic agents such as amines, anhydrides, phenols, and organo-metal compounds.

U.S. Pat. No. 4,254,012 to Green discloses cyanate ester resins curable by a first UV light exposure and a second heat treatment. The compositions include polymeric cyanate ester resins; photopolymerizable compounds, such as acrylate esters; and heat activated catalysts such as Lewis acids, proton acids, bases, e.g., trimethylamine, phosphorous compounds, e.g., tributylphosphane, and organo-metals, e.g., zinc octanoate. The compositions also include a photoactivated polymerization catalyst such as an organic peroxide, a benzophenone, an acetophenone or other related photoinitiator or photosensitizer. The Green compositions are useful as coatings and may be adapted to filament winding.

U.S. Pat. Nos. 4,546,131, 4,559,399, 4,611,022 to Hefner, Jr., disclose thermosettable cyanate ester resin compositions comprising cyanate esters, epoxy compounds, and acrylates. These thermosettable composition also disclose thermally activated catalysts such as organic peroxides, various bases, "onium" salts, and trimerization catalysts such as organo-cobalt compounds. The Hefner, Jr. compositions may be adapted to filament winding applications. These compositions are not, however, adapted to UV light curing processes. Nor are the disclosed organic peroxides described as useful as heat-activated catalysts for improving the resistance of the compositions to dripping during heating.

The European Patent Application No. EP 266,986 to Amoco Corp. describes thermally cured resin compositions including cyanate esters, epoxy resins, and a thermoplastic polymer. Preferred cyanates are the cyanates of bisphenols. Preferred epoxies are polyglycidyl derivatives of phenols, novolaks, amines, and esters of carboxylic acids. The thermoplastic polymer may be either a polyacrylate or a polyetherimide. The compositions may also include bismaleimides for further polymerization with the resins. Thermally activated catalysts and accelerators described as useful for the resins include tertiary amines, phenols and transition metal organo-metal complexes. When bismaleimides are used, organic peroxides are described as preferred catalysts, but no disclosure is given regarding any class of peroxides useful for preventing drip during heat curing. The Gardner et al. resins may be adapted to filament winding. The Gardner et al. compositions, however, do not include acrylate type compounds and are not adapted to actinic light curing processes.

European Patent Document No. EP 347,800 to Mitsubishi Gas Chemical Co. Inc. discloses cyanate ester resin compositions including at least one acrylic resin, a saturated polyester or epoxy resin, an aromatic polycyanate, and a curing catalyst. Preferred epoxies include bisphenol type epoxies. The disclosed catalysts include organic peroxides, tertiary amines, phenols, anhydrides, and organo-metal salts as the preferred salts. The Mitsubishi compositions are described for coatings applications, but are not described as applicable to filament winding applications. Furthermore, the Mitsubishi compositions are not adapted to actinic radiation curing processes.

PCT Document No. WO 92/03516 to 3M Company describes single or dual cured adhesive compositions comprising at least one cyanate ester, a thermoplastic polymer, and an organo-metallic catalyst. The compositions may also include a silane coupling agent having an epoxy, glycidoxy, acrylic, amino or other hydrolyzable group. Preferred cyanates include cyanates of bisphenols and novolaks. Preferred thermoplastic polymers include polyesters, polyimides, and polyvinyls, including polyacrylates. The organo-metal catalysts disclosed in this document may be either heat activated or actinic light activated. The 3M patent document does not, however, disclose the use of an ultraviolet sensitive photoinitiator. Nor does the 3M patent document include epoxy type compounds except for the linkage of epoxy functionalities to the silane agents used for coupling the resin to a substrate. These compositions also are not adapted to filament winding operations.

A publication by Ising et al., entitled "Cyanate Cured Behavior and the Effect on Physical and Performance Properties" *Third International SAMPE Electronics Conference,* 360–370 (1989), discloses thermally cured resin compositions comprising cyanate esters, a bisphenol A epoxy resin, and an organo-metal catalyst. The Ising et al. compositions do not include acrylates and are not adapted to actinic light curing processes, having no actinic light sensitive component. These compositions also are not adapted for filament winding, but are described as useful for castings and laminates.

An anonymous publication entitled "Uncured Resin Mixture of Cyanate Ester Resin and Epoxy Resin Modified with Particulate Elastomer and Polymeric Material Prepared Therefrom" (1991), discloses thermosetting resin compositions including a polyaromatic cyanate ester, an epoxy resin, such as DGEBA, and an insoluble elastomeric particulate. The insoluble elastomeric particulate may include polyacrylates dispersed in a liquid diglycidyl ether of bisphenol A (DGEBA). Curing agents for these compositions include organo-cobalt compounds. These compositions are not adapted to actinic light curing processes and contain no photoinitiators. These resins may be reinforced with fibers, but are not described as useful for filament winding applications.

A publication by Shimp et al., entitled "Cyanate Ester-Cured Epoxy Resin Structural Composites" *37th International SAMPE Symposium,* 293–305 (1992), provides a theoretical description of reaction pathways of cyanate-epoxy resin compositions. Shimp et al. also describe preparation methods for cyanate-epoxy compositions. Useful epoxies are described as including DGEBA, and the disclosed cyanates include bisphenol dicyanates. Disclosed catalysts include organo-titanate and organo-cuprate compounds. The Shimp et al. publication discloses resins that are curable by heat, but does not disclose any compositions curable by actinic radiation. The compositions of the Shimp et al. publication are described as adapted to various processes including filament winding.

Therefore, it would be a significant advance in the art to provide resin compositions and methods of using such compositions capable of overcoming the above-described difficulties associated with filament winding processes, in a manner which would obviate the use of additional curing steps and long rotation periods heretofore necessary to obtain quality composites having uniform characteristics.

The present invention solves the disadvantages inherent in the prior art by providing compositions that maintain stable low viscosities for a significant period of time, such that commercial filament winding processes are practicable. The compositions of the present invention also exhibit relatively high glass transition temperatures and are intended to be useful in high temperature applications. Unexpectedly, the resin compositions of the present invention allow uniform properties of the cured product to be obtained without drip or excessive flow of the resin during the heat-cure stage.

Accordingly, it is a purpose of the present invention to provide an improved process for forming fiber/resin composites.

It is a further purpose of the invention to provide an improved process for filament winding which overcomes the above-described deficiencies of the prior art practice of these processes.

It is another purpose of the invention to provide filament wound articles which are readily and economically formed, and which are rapidly processed for subsequent handling, packaging, or other processing operations.

Other purposes and advantages of the present invention will be more fully apparent from the ensuing disclosure and appended claims.

SUMMARY OF THE INVENTION

In one aspect, the present invention relates to dual-curing resin compositions useful for filament winding applications. The compositions include an epoxy component, including at least one polyepoxide resin curable by heat; an olefinically unsaturated monomer component, including at least one polyolefinically unsaturated monomer curable by actinic radiation; a cyanate ester component, including at least one compound having at least two cyanate (—OCN) functional groups; at least one organic peroxide; at least one photoinitiator; and at least one heat activated curing agent. The compositions of the present invention have an initial viscosity of less than about 2000 centipoise (cps), and are capable of retaining substantially the same viscosity for at least about 6 months at about ambient temperature, i.e., at temperatures below about 50° C., preferably from about 20° C. to about 30° C. On being exposed to actinic radiation the compositions are capable of being immobilized to a gelled state which will resist substantial resin drip during the subsequent heat cure process.

Polyepoxide resins useful in the compositions of the present invention may be selected from the classes consisting of polyglycidyl and poly(β-methylglycidyl)ethers of dihydric and polyhydric alcohols and phenols, novolaks, alkyl-substituted phenols and halogen-substituted phenols; poly(N-glycidyl) compounds obtained from amines containing at least 2 amino-hydrogen atoms; triglycidylisocyanurate; N,N'-diglycidyl derivatives of cyclic alkaline ureas and hydantoins; and poly(S-glycidyl) derivatives of dithiols. Mixtures of these resins are also useful.

The compositions of the present invention contain at least one polyolefinically unsaturated monomer selected from the group consisting of acrylic and methacrylic resins, vinyl monomers, and unsaturated polyesters solubilized in vinyl monomers. The compositions may also include one or more mono-olefinically unsaturated monomers useful as diluents.

Useful cyanate ester components include single cyanate esters or mixtures thereof. Cyanate esters may be monomeric, oligomeric, or polymeric, with at least one cyanate ester compound in the composition having at least two cyanate ester functional groups (—OCN) per molecule. Such cyanate esters may include polyaromatic cyanate esters, such as cyanate esters of bisphenols or cyanate esters of polymeric dicyclopentadiene structures.

The resin compositions include an organic peroxide selected from the group of organic peroxides having 10 hour decomposition half-lives at temperatures of from about 50° C. to less than about 104° C. Peroxides having decomposition half-lives at temperatures above the upper range have generally not been found to be effective at preventing resin drip. In general, useful peroxides include diacyl peroxides, peroxydicarbonates, peroxyesters, and peroxyketals. Mixtures of peroxides are also contemplated.

Useful photoinitiators include benzophenone and substituted benzophenones, acetophenone and substituted acetophenones, benzoin and its alkyl ethers, xanthone and substituted xanthones, camphoroquinone peroxyesters, and 9-fluorene carboxylic acid peroxyesters. Mixtures of these compounds may be employed.

Heat activated catalysts useful for the invention include the group consisting of inorganic and organic metal salts dissolved in hydroxyl group-containing organic compounds such as phenols and bisphenols ("phenolic compounds").

In one embodiment, the present invention includes a process for producing fiber/resin composites comprising a fiber substrate and a dual-cured resin composition. The resin composition will comprise at least one polyepoxide resin curable by heat, at least one polyolefinically unsaturated monomer which when subjected to sufficient actinic radiation immobilizes the polyepoxide resin, at least one cyanate ester, at least one organic peroxide, at least one photoinitiator, and at least one heat activated curing agent. In this process, the fiber resin composite is initially cured by exposure to actinic radiation sufficient to immobilize the polyepoxide resin so that the resin exhibits no resin drip when subjected to a further heat cure step.

In another aspect, the present invention includes fiber/resin composites formed by the process of applying a liquid resin, having a viscosity of about 2000 centipoise (cps) or less and a shelf-life of at least about 6 months at about ambient temperature, to a fiber, subjecting the fiber/resin composite to actinic radiation sufficient to permanently immobilize the resin, and then subjecting the fiber resin composite to heat sufficient to cure the resin. The resin composition comprises a heat curable polyepoxide resin, an actinic radiation curable polyolefinically unsaturated monomer, a cyanate ester, an organic peroxide, a photoinitiator, and a heat activated curing agent for epoxies.

DETAILED DESCRIPTION

Product articles according to the present invention may be made by any of a wide variety of fiber/resin composite forming methods, including those utilized in forming fiber/resin matrices comprising discontinuous fibers. For example, lay-up techniques, sheet molding, resin transfer moldings, etc., as well as methods applicable to the use of continuous filament, such as filament winding, braiding, and pultrusion may be used. Further, fiber/resin composite articles may be formed by a combination of these methods, such as where a solid rod is formed by pultrusion and subsequently used as the core body for filament winding.

In one preferred embodiment, the articles produced according to the invention may comprise a filament array of substantially parallelly aligned, laterally continuous filaments which have been impregnated with the resin compositions of the invention and subjected to actinic radiation curingly effective for the actinic radiation curable resin component of the composition.

As used herein, the term "laterally continuous", when used to describe filament arrays of parallelly aligned filaments, means that the adjacent filaments in the parallelly aligned array have the resin composition between their facing surfaces, without gross voids, spaces, or discontinuities therebetween. The resin composition possesses sufficient flow characteristics, as distinct from drip or sag, to uniformly bind adjacent filaments together.

In producing filament wound articles according to the present invention, wherein the filaments are treated, i.e., coated or impregnated, with the resin composition, the actinic radiation may be applied to the filament prior to, simultaneously with, or subsequent to winding of the treated filament onto the substrate mandrel. Such concurrent actinic irradiation of the resin borne on the filament facilitates a high degree of processing flexibility in the fabrication of such filament wound articles. In this manner, winding of articles of substantially irregular shape is facilitated because irradiating impregnated fibers prior to substrate contact can impart sufficient adhesive and tack qualities to cause the fiber to adhere to the substrate and/or each other while passing over areas where slippage would normally occur. Thus, in some instances, it may be advantageous to irradiate the impregnated filament prior to its application by winding onto the substrate. Alternatively it may be desirable to filament wind the mandrel, and subsequently to irradiate the wound article.

Similarly, in the pultrusion formation of filament articles according to the present invention, an array of parallelly aligned filaments is pultruded through a die imparting a selected cross-sectional shape thereto, the filament having been impregnated with the resin composition of the invention. The resulting shaped filament array is subjected to curingly effective actinic radiation concurrently with its passage through the die. Such concurrent irradiation may be effected either prior to or subsequent to passage of the filament array through the die, insofar as the ultimate shape is imparted somewhat upstream of the die in proximity to the forming die openings. In a specific application, the particular placement and operation of the actinic radiation source for effectuating curing will be readily determinable by those skilled in the art without undue experimentation.

The use of UV light provides significant processing and handling advantages during manufacture by instantly immobilizing the resin. Immobilization of the resin is controlled to provide sufficient gelation to prevent flow out of the part but allow good wetting between layers, thus assuring even resin distribution, reduced void formation and ease of handling of the finished part without resin migration, sagging or dripping. The rapid gelation stage, in most cases, also eases handling during the heat-cure.

Advantages of the present invention include elimination of runs, drips, migration, and resin-rich/resin-poor areas; curing of the resin while parts are stationary, i.e., no requirement for rotation; a process which yields even resin distribution, reduced voids, lessens clean up and reduces resin usage and waste; and the low initial viscosity promotes exceptionally fast filling of parts and composite structures which can be rapidly controlled by UV radiation.

The filament winding processes used with the present compositions are for the most part continuous processes. It should be noted that, because of the continuous nature of these processes, the resins must exhibit stable low viscosities, i.e., they must exhibit extended pot-lives. In many conventional resins, pot-life tends to be disadvantageously short, e.g., on the order of minutes or hours. Among the advantages of the resins of the present invention is that the resins have low viscosities for periods on the order of months or longer. As a result, not only do the resins exhibit the necessary excellent pot-life, but they also exhibit excellent storage characteristics, i.e., shelf-life. The shelf-life of the compositions of the invention is essentially unlimited as long as the resins are protected from excessive temperatures and excessive exposure to other forms of energy, e.g., ultraviolet light, capable of affecting resin components.

Typically, in the filament winding process, the resin composition is housed in an open vessel beneath a rotating roller. The rotating roller is partially submerged in the resin so as to coat the roller as it rotates. Fiber is drawn from a spool and directed through the resin and into contact with the roller surface, whereby the fiber is coated with resin as it passes. Actinic radiation is directed at the coated fiber as it leaves the roller, thereby gelling and immobilizing the resin. The gelled resin is wound on a mandrel, as previously described, and may be further cured, if desired or necessary, by actinic radiation prior to heat cure.

Subsequent to winding, the formed article is placed in an oven at an appropriate cure temperature. In general, the compositions or the present invention can substantially reach a fully cured state by heat curing at about 150° C. to about 250° C. for about one to eight hours. It will be appreciated by those skilled in the art that the time and temperature of the heat cure may be varied to reach particular desired results.

The dual curing filament winding resins of the present invention are formulated with the aforementioned polyolefinically unsaturated monomers, and preferably polyacrylate monomers, that form a cross-linked gel upon exposure to actinic radiation, and preferably UV light. This crosslinking prevents resin dripping from the part during the winding and during the heat cure. However, when certain fibers are employed that screen UV light, such as graphite or Kevlar, or when using high winding speeds with most fibers, a portion of the acrylate can remain uncured after exposure to UV light. Thus, although the resin does not drip off the part during filament winding, it may tend to drip during the heat-cure cycle unless appropriate measures are taken to reduce the flowability of the resin.

The degree of gelation of a given resin composition will largely depend on the amount and type of actinic radiation to which it is exposed. Exposure time is easily controllable, as is the intensity and type of radiation. These parameters are easily determinable by one reasonably skilled in the art, and may vary in accordance with the choice of resin composition, fiber substrate and type of product desired. Single or multiple actinic sources, for example UV light, may be focused on the resin-coated fiber to effectuate gelation. The winding speed can also be closely controlled, thereby controlling the duration of exposure of the resin-coated fiber to the beam of radiation. In certain commercial applications, winding speeds of about 6 inches/second to about 30 inches/second are useful. Radiation intensities of, for example, UV light, may be from about 120 milliwatts/cm$^2$ to about 500 milliwatts/cm$^2$. These ranges are not in any way intended to be limiting of the present invention, but are merely illustrative of certain useful ranges. Other winding speeds and intensities of light may easily be chosen by those skilled in the art.

In addition, the dilution of the polyolefinically unsaturated portion of the composition by the unreacted epoxy system, and the increased viscosity that occurs upon gelation, together can reduce the degree of vinyl reaction relative to a 100 wt. % vinyl composition, further impeding the thoroughness of the cross-linking and reducing the resin's capacity to resist dripping when heated.

The inclusion of a thermally activated radical source, i.e., a peroxide, will tend to increase the extent of the vinyl reaction as the composition is heated. One effect of a more complete vinyl reaction is to compensate for the decreased viscosity that occurs as the composition heats up to the heat cure onset temperature of the major components (usually a heat-curing epoxy system). Another effect is to compensate for possible inadequacies in the geometry of the actinic cure step where exposure of the resin to the actinic source(s) is not optimal. The peroxide enables the further extension of the gelation of the resin to any portions of the resin which are less fully exposed to the actinic source. The intent is to retain a tacky, relatively soft gel during the application stage, so as to improve adhesion and facilitate handling during fabrication, while at the same time producing a composition which will not drip during the curing heat-up stage.

While not wishing to be bound by any one theory, applicants believe that the peroxide plays a role in the reaction of unreacted vinyl groups trapped in the epoxy resin diluted gel formed during the irradiation stage. Normally, it would be expected that these groups might thermally polymerize during the final high temperature epoxy cure. It is possible, however, that the more extensive vinyl polymerization at a lower temperature, produced by initiation using a suitable peroxide, leads to a stronger structure when the cyanate ester/epoxide copolymerization reaction takes over. Alternatively, the peroxide may be producing direct vinyl bonding to the cured epoxy by abstraction on epoxy compounds followed by vinyl addition to the new radical sites.

As was discussed above, the resin component of partially cured filament wound articles will tend to drip upon heating, generally requiring the rotation of the articles during heat curing to avoid anisotropies. For example, resin formulations in accordance with the present invention, but containing no peroxide, were used to form composite articles as described elsewhere herein. Articles were formed by filament winding onto mandrels to which thermocouples had been attached, and the rise in temperature of the article during heat cure was then correlated with the onset of resin drip.

It was observed that the onset of the drip of the resins of the present invention will occur, in the absence of peroxide, generally in the range of from about 80° C. to about 100° C., depending upon the composition of the resin. The peroxide chosen for use in any particular resin formulation will therefore depend in part on the resin drip onset temperature of the formulation. To be useful for the present invention, the peroxide selected must provide sufficient additional cross-linking of the gel to offset any decrease in resin viscosity that would otherwise occur during the heat-up process. In addition, for the benefit of the peroxide to be obtained, the offsetting cross-linking induced by the thermally activated peroxide must occur at a temperature below or near the temperature at which the drip phenomenon begins. Because the decomposition of each peroxide is expressed as a ten hour half-life function of temperature, a peroxide will begin to decompose at temperatures below its ten hour half-life temperature ($T_{1/2}$). The peroxide can therefore begin to cross-link the gelled resin before the temperature rises sufficiently to otherwise cause the resin to drip. In general, the peroxides useful in the present invention will have a $T_{1/2}$ less than about 104° C. Peroxides having $T_{1/2}$'s of about 104° C. or greater generally have not been found to be useful in the resins of the invention. It is believed that such peroxides do not generate sufficient cross-linking of the gel until after resin drip has begun during the heat-up process.

Thus, a range of dual-curing cyanate/epoxy/polyolefinically unsaturated formulations has been developed. These compositions are designed to form a soft gel which allows for interlayer wetting when exposed to UV radiation. The compositions are further designed to retain their non-flow properties during the heat-up stage of heat-curing by producing additional immobilizing cross-linking during the heat-up. This is accomplished by means of a thermally activated radical source in the formulation, namely the class of peroxides described herein.

A peroxide, which decomposes on heating to form radicals is added to the formulation to initiate the polymerization of any unreacted polyolefinically unsaturated monomer. The choice of peroxide is critical to prevent dripping during heat-cure. The peroxide must possess a 10 hour half-life decomposition temperature of less than about 104° C. A peroxide with a higher value decomposes too slowly and the polyolefin does not polymerize sufficiently to prevent dripping during the heat-cure.

The preferred class of compositions of the present invention are created by mixing an epoxy resin component comprising at least one polyepoxide, a cyanate component comprising at least one compound having at least two cyanate ester functional groups per molecule, a polyolefinic component including at least one polyacrylate, a photoinitiator, an organic peroxide, and a heat activated curing agent for cyanate esters. The preferred resins have essentially unlimited shelf life, retaining a usable viscosity, i.e., less than about 2000 centipoise (cps), for a minimum of about 6 months at about ambient temperature, i.e., at temperatures below about 50° C., preferably from about 20° C. to about 30° C. The resin compositions have a glass transition temperature ($T_g$) in the range of about 150° C. to about 200° C. when fully cured.

The resin compositions of the present invention have an epoxy component present in an amount ranging from about 25 wt. % to about 50 wt. %, and preferably, from about 30 wt. % to about 40 wt. %; a cyanate ester component present in an amount ranging from about 25 wt. % to about 50 wt. %, and preferably, from about 30 wt. % to about 40 wt. %; a polyolefinic component present in an amount ranging from about 5 wt. % to about 30 wt. %, and preferably, from about 15 wt. % to about 25 wt. % of the composition. Most preferably the polyolefin component is present at about 20 wt. % of the composition. The heat activated curing agent is generally present in an amount of from about 0.01 wt. % to about 6.0 wt. %. The preferred heat activated curing agent is a solution of an organo-metal component in a phenolic component. The organo-metal component of the heat activated curing agent is generally present in the resin composition in an amount of from about 0.01 wt. % to about 1.0 wt. %, and preferably, from about 0.05 wt. % to about 0.2 wt. %. The phenolic component of the heat activated curing agent may be included in the resin composition in an amount of from about 0.1 wt. % to about 10.0 wt. %, and preferably, from about 0.5 wt. % to about 1.5 wt. %. The photoinitiator is generally present in an amount ranging from about 1 wt. % to about 10 wt. %, and most preferably from about 2 wt. % to about 5 wt. %. The free radical initiator (organic peroxide) is present in an amount ranging from about 0.2 wt. % to about 2 wt. %, and preferably from about 0.5 wt. % to about 1.5 wt. %.

Miscellaneous additives such as wetting and defoaming agents can be added collectively in amounts of from about 0.5 to about 1% by weight of the composition. Optionally, fire retardant materials such as phosphorous-containing compounds may be present in amounts of from about 2% to about 10%, and preferably from about 3% to about 5% by weight of the composition.

The cyanate ester component comprises at least one cyanate ester compound (monomer, oligomer, or polymer). Preferably, the cyanate ester component comprises at least one compound having two or more —OCN functional groups per molecule (for convenience referred to as "cyanate ester"). Typically, the cyanate ester has a cyanate equivalent weight of about 50 to 500, preferably about 50 to 250. The molecular weights of the useful cyanate ester compounds are typically in the range of about 150 to 2000.

The cyanate ester component preferably includes one or more cyanate ester compounds according to Formulas I, II, or III.

Formula I is $$Q(OCN)_p \quad \text{Formula I}$$

wherein p can be an integer from 2 to 7, and wherein Q comprises at least one of: (1) a mono-, di-, tri-, or tetrasubstituted aromatic hydrocarbon containing 5 to 30 carbon atoms, and (2) a mono-, di-, tri-, or tetrasubstituted aliphatic hydrocarbon containing 1 to 5 carbon atoms, and (3) a mono-, di-, tri-, or tetrasubstituted polycyclic aliphatic hydrocarbon containing 7 to 20 carbon atoms. Optionally, (1), (2) and (3) may contain 1 to 10 heteroatoms selected from the group consisting of non-peroxidic oxygen, sulfur, non-phosphino phosphorus, non-amino nitrogen, halogen, and silicon.

Formula II is

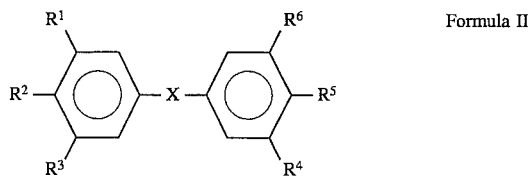

Formula II where X is a single bond, a $C_1$–$C_4$ alkylene group, —S—, or the —$SO_2$— group; and where $R^1$, $R^2$, $R^3$, $R^4$, $R^5$, and $R^6$ are independently —H, a $C_1$–$C_5$ alkyl group, or the cyanate ester group (—OCN), with at least two of $R^1$, $R^2$, $R^3$, $R^4$, $R^5$, and $R^6$ being the cyanate ester group. $R^1$, $R^2$, $R^3$, $R^4$, $R^5$, and $R^6$ are preferably —H, —$CH_3$, or the cyanate ester group.

Formula III is

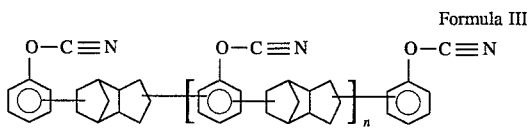

Formula III where n is 0 to 5.

The cyanate esters useful in the invention may be employed in amounts ranging from about 25 wt. % to about 50 wt. %. It is preferred that the cyanate esters be included in an amount of from about 30 wt. % to about 40 wt. %. The cyanate ester component may be present as a single cyanate ester, preferably having at least two —OCN functional groups per molecule, or as a mixture of cyanate esters, preferably including at least one dicyanate ester. Preferred cyanate esters useful in the present invention include the polyaromatic cyanate esters, such as the dicyanate esters of bisphenols. Especially preferred cyanate esters include the dicyanate esters of bisphenol A, such as the AroCy B-10 cyanate ester monomer, available from Rhone-Poulenc; the dicyanate esters of tetramethyl bisphenol F, such as AroCy M-10, available from Rhone-Poulenc; and the dicyanate esters of bisphenol E, such as AroCy L-10, also available from Rhone-Poulenc. Alternatively, a semi-solid dicyanate oligomer of bisphenol A may be employed in conjunction with a cyanate ester of lower viscosity. An especially preferred cyanate ester oligomer is the dicyanate oligomer of bisphenol A, such as the AroCy B-30 semi-solid resin, available from Rhone-Poulenc. An alternative especially preferred polycyanate resin is a polymer based on the dicyclopentadiene structure available as XU-71787.02 from Dow Chemical Co.

It will be understood by those persons having ordinary skill in the art that the foregoing list of cyanate esters is only illustrative in character, and that other cyanate ester compounds may potentially be employed.

Epoxy resins useful in the compositions of the present invention include polyepoxides curable by elevated temperature. Examples of these polyepoxides include polyglycidyl and poly(β-methylglycidyl) ethers obtainable by reaction of a compound containing at least two free alcoholic hydroxyl and/or phenolic hydroxyl groups per molecule with the appropriate epichlorohydrin under alkaline conditions or, alternatively, in the presence of an acidic catalyst and subsequent treatment with alkali. These ethers may be made from acyclic alcohols such as ethylene glycol, diethylene glycol, and higher poly(oxyethylene) glycols, propane-1,2-diol and poly(oxypropylene) glycols, propane-1,3-diol, butane-1,4-diol, poly(oxytetramethylene) glycols, pentane-1,5-diol, hexane-2,4,6-triol, glycerol, 1,1,1-trimethylolpropane, pentaerythritol, sorbitol, and poly(epichlorohydrin); from cycloaliphatic alcohols such as resorcinol, quinitol, bis(4-hydroxycyclohexyl)methane, 2,2-bis(4-hydroxycyclohexyl)propane, and 1,1-bis(hydroxymethyl)cyclohex- 3-ene; and from alcohols having aromatic nuclei, such as N,N-bis(2-hydroxyethyl)aniline and p,p'-bis(2-hydroxyethylamino)diphenylmethane. Or they may be made from mononuclear phenols, such as resorcinol and hydroquinone, and from polynuclear phenols, such as bis(4-hydroxyphenyl)methane, 4,4'-dihydroxydiphenyl, bis (4-hydroxyphenyl) sulphone, 1,1,2,2-tetrabis (4-hydroxyphenyl) ethane, 2,2-bis (4-hydroxyphenyl)propane (otherwise known as bisphenol A), 2,2-bis (3,5-dibromo-4-hydroxyphenyl)propane, and novolaks formed from the combination of aldehydes, such as formaldehyde, acetaldehyde, chloral, and furfuraldehyde, with phenols, such as phenol itself, and phenols substituted on the ring by chlorine atoms or by alkyl groups each containing up to nine carbon atoms, such as 4-chlorophenol, 2-methylphenol, and 4-t-butylphenol.

Poly(N-glycidyl) compounds include, for example, those obtained by dehydrochlorination of the reaction products of epichlorohydrin with amines containing at least two aminohydrogen atoms, such as aniline, n-butylamine, bis(4-aminophenyl)methane, and bis(4-methylaminophenyl)methane; triglycidyl isocyanurate; and N,N'-diglycidyl derivatives of cyclic alkylene ureas, such as ethyleneurea and 1,3-propyleneureas, and of hydantoins such as 5,5-dimethylhydantoin.

Epoxide resins having the 1,2-epoxide groups attached to different kinds of hetero atoms may be employed, e.g., the N,N,O-triglycidyl derivative of 4-aminophenol, the glycidyl ether-glycidyl ester of salicylic acid, N-glycidyl-N'-(2-glycidyloxypropyl)-5,5-dimethylhydantoin, and 2-glycidyloxy-1,3-bis(5,5-dimethyl- 1-glycidylhydantoin-3-yl)propane.

Such epoxies are available from a variety of commercial sources, such as the EPON series from Shell Chemical Co., the EPI-REZ series from Rhône-Poulenc, the Araldite series from Ciba-Geigy, the D.E.R. series from Dow Chemical Co., and the EPOTUF series from Reichhold.

Also useful are halogenated epoxy resins such as the brominated epoxides available from the sources shown above. Halogenated epoxy resins in combination with other fire retardant materials may be suitable for use as fire retardant additives in the compositions of the present invention.

Especially preferred epoxy resins useful in the present invention are the diglycidyl ethers of bisphenol A marketed under the tradenames EPON 825 and EPON 828 available from Shell Chemical Co., D.E.R. 331 and 332 available from Dow Chemical Co., and the cycloaliphatic epoxy resin marketed as ERL-4221 by Union Carbide Co.

Various epoxies such as the glycidyl ethers marketed as the EPODIL series by Pacific Anchor Chemical Corporation, a division of Air Products and Chemicals Inc., may be added as epoxy diluents, to reduce the viscosities of the resins of the present invention.

It will be understood that the foregoing list of epoxy compounds is intended only to be illustrative in character, and that other compounds having 1,2-epoxide functionality and curable by heat may potentially be employed. Other optional epoxy compounds may be present which have both epoxy functionality and olefinically unsaturated functionality ("dual-functional" resins).

Epoxy compounds are included in the resin compositions of the invention in an amount of from about 25 wt. % to about 50 wt. %, preferably from about 30 wt. % to about 40 wt. %.

Suitable polyolefinically unsaturated components of the compositions may include poly(meth)acrylic resins, polyvinyl monomers, and polyunsaturated polyesters solubilized in vinyl monomers. As used herein, the term "(meth)acrylic" is intended to be broadly construed to include acrylic as well as methacrylic compounds, e.g., acrylic esters and methacrylic esters.

It is preferred that the polyolefinically unsaturated monomer have a low viscosity to offset the effect of any higher viscosity component so as to retain the low composition viscosity required for effective filament winding. In addition, the polyolefinically unsaturated monomer component may comprise one or more low viscosity monoolefinically unsaturated monomers as diluents, but in any event, the olefinically unsaturated monomer component must comprise at least one polyolefinically unsaturated monomer. As used herein "polyolefinically unsaturated" means having at least two olefinic double bonds. The polyolefinically unsaturated monomers may be used in amounts of from about 5% to about 30% and preferably from about 15% to about 25% by weight of the composition.

Polyacrylates are generally useful, including 1,3-butylene glycol diacrylate, diethylene glycol diacrylate, 1,6-hexanediol diacrylate, neopentylglycol diacrylate, polyethylene glycol diacrylate, tetraethylene glycol diacrylate, methylene glycol diacrylate, pentaerythritol tetraacrylate, tripropylene glycol diacrylate, ethoxylated bisphenol-A-diacrylate, trimethylolpropane triacrylate, di-trimethylolopropane tetraacrylate, dipenterythritol pentaacrylate, pentaerythritol triacrylate and the corresponding methacrylate compounds. Also useful are reaction products of (meth)acrylic acid and epoxide resins, and urethane resins. Other suitable poly(meth)acrylic ester compounds are also described in U.S. Pat. Nos. 4,051,195, 2,895,950, 3,218,305, and 3,425,988.

Useful (meth)acrylic resins include esters and amides of (meth)acrylic acid as well as comonomers thereof with other copolymerizable monomers. Illustrative esters include methyl acrylate, methyl methacrylate, hydroxyethyl acrylate, butyl methacrylate, octyl acrylate, and 2-epoxyethyl acrylate. Illustrative amides include butoxymethyl acrylamide, methacrylamide, and t-butyl acrylamide. Also suitable are copolymers of such compounds, and copolymers with other monomers containing polymerizable vinyl groups.

Another class of resins which are actinic radiation curable and potentially suitable for use in the compositions in the invention include vinyl monomers such as styrene, vinyl toluene, vinyl pyrrolidone, vinyl acetate, divinyl benzene, and the like.

A further useful class of actinic radiation curable resin materials comprises unsaturated polyesters, solubilized in vinyl monomers, as ordinarily prepared from alpha-beta ethylenically unsaturated polycarboxylic acids and polyhydric alcohols, as described for example in U.S. Pat. No. 4,025,407.

Particularly preferred polyolefinically unsaturated components include trimethylolopropane trimethacrylate, trimethylolpropane triacrylate, dipentaerythritol pentaacrylate, pentaerythritol triacrylate, ethoxylated trimethylolpropane triacrylate, 1,6-hexanediol diacrylate, neopentyl glycol diacrylate, pentaerythritol tetraacrylate, and 1,3-butylene glycol diacrylate. Preferred monoacrylates include cyclohexylacrylate, 2-ethoxyethyl acrylate, 2-methoxyethyl acrylate, benzoyl acrylate, and isobornyl acrylate. Such compounds are available from a variety of sources. For example, a preferred polyacrylate, dipentaerythritol monohydroxypentaacrylate, is available as SR 399 from Sartomer Co.

It will be understood by those skilled in the art that the foregoing listing of polyolefinically unsaturated compounds is intended only to be illustrative in character, and that any other resin compounds having such functionality in their molecules and curable under actinic radiation conditions may potentially be employed. In addition to those monomers required to be present, other optional monomers may be present which have both acrylate and epoxy functionality ("dual-functional" monomers).

The present invention requires the use of organic peroxides having 10 hour decomposition half-lives (10 hr. $T_{1/2}$) at temperatures of from about 50° C. to less than about 104° C. Peroxides having 10 hour decomposition half-lives at temperatures below this range yield compositions which tend to not have stable shelf-life characteristics. Peroxides having 10 hour decomposition half-lives at temperatures above this range, on the other hand, have generally not been found to be effective in preventing resin drip during the heat cure stage.

Useful peroxides include various diacylperoxides such as diisononanoyl peroxide, decanoyl peroxide, lauroyl peroxide, succinic acid peroxide, and benzoyl peroxide.

Also useful are various peroxydicarbonates such as di(n-propyl) peroxydicarbonate, di(sec-butyl) peroxydicarbonate, and di(2-ethylhexyl) peroxydicarbonate.

Further useful peroxides include various peroxyesters such as α-cumylperoxyneodecanoate, 1,1-dimethyl- 3-hydroxy-butylperoxyneoheptanoate, α-cumylperoxyneoheptanoate, t-amyl-peroxyneodecanoate, t-butylperoxyneodecanoate, t-amyl-peroxypivalate, t-butylperoxypivalate, 1-1-dimethyl-3-hydroxy-butylperoxy- 2-ethylhexanoate, 2,5-dimethyl-2,5-di(2-ethylhexanoylperoxy) hexane, t-amylperoxy-2-ethylhexanoate, t-butylperoxy- 2-ethylhexanoate, t-butylperoxyisobutyrate, t-butylperoxymaleic acid, t-butylperoxyacetate, t-amylperoxyacetate, t-amylperoxybenzoate, OO-t-butyl-O-isopropylmonoperoxycarbonate, 2,5-dimethyl-2,5-di(benzoylperoxy)hexane, OO-t-butyl-O-(2ethylhexyl)monoperoxycarbonate, and OO-t-amyl-O-(2-ethylhexyl)monoperoxycarbonate.

In addition, certain peroxyketals are useful in the present invention including 1,1-di(t-butylperoxy)-3,3,5-trimethyl cyclohexane, 1,1-di(t-butylperoxy)cyclohexane, and 1,1-di(t-amylperoxy)cyclohexane.

Preferred organic peroxides include lauroyl peroxide, having a 10 hr. $T_{1/2}$ of 64° C.; t-amylperoxy-2-ethylhexanoate, having a 10 hr. $T_{1/2}$ of 75° C.; and 1,1-di(t-butylperoxy)- 3,3,5-trimethylhexane having a 10 hr. $T_{1/2}$ of 96° C. Lauroyl peroxide is available as Alperox-F; t-amylperoxy-2-ethylhexanoate is available as Lupersol 575; and 1,1-di(t-butylperoxy)-2,2,5-trimethylhexane is available as Lupersol 256; all available from Elf Atochem North America, Inc.

Organic peroxides are generally present in the compositions of the invention in an amount of from about 0.2 wt. % to about 2 wt. %, preferably from about 0.5 wt. % to about 1.5 wt. %.

As used herein, "actinic radiation" means electromagnetic radiation having a wavelength of about 700 nm or less which is capable, directly or indirectly, of curing the specified resin component of the resin composition. By indirect curing in this context is meant curing under such electromagnetic radiation conditions, as initiated, promoted, or otherwise mediated by another compound.

Accordingly, a photoinitiator may be added to the composition in an amount effective to respond to the actinic radiation and to initiate and induce curing of the associated resin, via substantial polymerization thereof.

Suitable photoinitiators useful with ultraviolet (UV) actinic radiation curing mono- and polyolefinic monomers include free radical generating UV initiators such as benzophenone and substituted benzophenones, acetophenone and substituted acetophenones, benzoin and its alkyl esters and xanthone and substituted xanthones. Preferred photoinitiators include diethoxy-acetophenone, benzoin methyl ether, benzoin ethyl ether, benzoin isopropyl ether, diethoxyxanthone, chloro-thio-xanthone, azo-bisisobutyronitrile, N-methyl diethanolaminebenzophenone, and mixtures thereof.

Visible light initiators include camphoroquinone peroxyester initiators and 9-fluorene carboxylic acid peroxyesters.

Particularly preferred photoinitiators include 2-hydroxy-2-methyl-1-phenyl-propan-1-one available as Darocur 1173 from EM Industries, Inc., and 2-benzyl-2-(dimethylamino)-1-[4-(4-morpholinyl)phenyl]-1-butanone available as Irgacure 369 from Ciba-Geigy.

Catalysts useful in the present invention include heat activated catalysts capable of accelerating curing of the cyanate resin component. Examples of such catalysts include organo-metal compounds such as lead naphthenate, lead stearate, zinc naphthenate, zinc octylate, tin oleate, stannous laurate, dibutyltin maleate, manganese naphthenate, cobalt naphthenate, acetylacetone iron, etc.; inorganic metal salts such as $SnCl_3$, $ZnCl_2$, $AlCl_3$, etc.; phenolic compounds such as phenol, xylenol, cresol, resorcinol, catechol, fluoroglycine, etc.; and solutions of an organo-metal component, including one or more organo-metal compounds, in a phenolic component, including one or more phenolic compounds.

In a preferred embodiment of the invention, the heat activated catalytic agent useful for catalyzing cyanate resin reactions includes an organo-metal salt component dissolved in a phenolic component.

In this preferred embodiment, the organo-metal component may be present in an amount of from about 0.01 wt. % to about 1.0 wt. % of the resin composition. It is preferred that the organo-metal component is present in an amount of from about 0.05 wt. % to about 0.2 wt. %. The phenolic component may be present in the resin composition in amounts ranging from about 0.5 wt. % to about 10 wt. %. Preferably the phenolic component is included in an amount of from about 0.5 wt. % to about 1.5 wt. %.

Preferred organo-metal salts include copper(II) acetyl acetonate, copper(II) naphthenate, cobalt(II) acetylacetonate, zinc(II) naphthenate, zinc(II) ethylhexanoate, manganese(II) naphthenate, and cyclopentadienyl iron(II) dicarbonyl dimer. Each of these organo-metal salts is readily available from various sources, for example Strem Chemical Corp., Newburyport, Mass. Other preferred organo-metal salts include titanium bis(ethyl-3-oxobutanolato-$O^1$, $O^3$) bis(2-propanolato) available as TYZOR® DC, from Dupont Co., Wilmington, Del.; and dibutyltin(IV) dilaurate, available from Atochem North America, Inc., Buffalo, N.Y.

Preferred phenolic compounds include nonyl phenol, bisphenol A, cresol, phenol, and catechol, each of which is readily available from various sources, including Aldrich Chemical Co., Milwaukee, Wis.

An especially preferred organo-metal salt/phenol heat activated curing agent is copper(II) naphthenate in nonyl phenol.

It will be understood by those persons having skill in the art that the foregoing lists of compounds and compositions useful as heat activated curing agents for cyanate esters is intended only to be illustrative in character, and that any other curing agents capable of heat activated curing of cyanate esters may potentially be employed.

Other additives conventionally used in the art which do not substantially interfere with the objectives of the present invention may be useful. Fillers, diluents, pigments, dyes, surface active agents, flame retardants and the like may be employed for their intended purposes.

The procedure for making the resin compositions of the present invention may be generally described as follows:

Raw materials may generally be used as received, without further purification.

Solid peroxides are dissolved in the acrylate component prior to addition to the other raw materials.

Liquid resins are mixed with other liquid components until the solution is homogeneous, with the liquid peroxide or peroxide/acrylate solution added last. The mixing temperature is generally maintained below 30° C.

Solid resins, such as AroCy B-10 or AroCy B-30, are melted prior to use, and mixed with the epoxy resin at elevated temperature (80°–120° C.) until the mixture is homogeneous. After cooling to room temperature, the remaining components are added to the cyanate ester/epoxy solution. The liquid peroxide or peroxide/acrylate solution is added last and the mixing temperature is kept below 30° C.

The mixture is then ready for filament winding or preparation of prepreg.

Consolidation of the adjacent layers into a unitary structure requires sufficient flow of the gelled resin during the heat-cure stage to meld the adjacent filaments into an integral whole and produce a quality part. In cases where excessive UV exposure has been applied in an attempt to alleviate subsequent dripping, the acrylate matrix is too rigid to allow such flow to occur. On the other hand, if the acrylate is insufficiently exposed to actinic radiation so as to create too soft a gel, dripping during the heat-cure stage is inevitable. The immobilization of the resin by actinic radiation must produce a lattice-like matrix that has sufficient gel structure to prevent dripping, but enough flowable character to allow the merger of the respective layers into a unitary mass during the heat cure stage.

The following non-limiting examples are intended to further illustrate the present invention. Unless otherwise noted, amounts are given parts per hundred parts of the epoxy resin component (phr). That is, given the presence of 100 parts of epoxy resin, the other components in the composition are indicated as a number of parts of the composition relative to the epoxy resin. Viscosities were determined by measuring 75 gram samples in a Brookfield DV I viscometer, using a 25° C. water bath.

TABLE 1

| | COMPOSITIONS | |
|---|---|---|
| MATERIALS | 1 | 2 |
| CYANATE ESTER | | |
| AROCY L-10, phr | 100 | 100 |

TABLE 1-continued

| MATERIALS | COMPOSITIONS | |
|---|---|---|
| | 1 | 2 |
| CURING AGENT | | |
| NONYL PHENOL, phr | 2 | 2 |
| Cu NAPHTHENATE, phr | 0.30 | 0.30 |
| EPOXY | | |
| EPON 825, phr | 100 | 100 |
| ACRYLATE | | |
| DPEMPA*, phr | 40 | 20 |
| ETMPTA*, phr | — | 20 |
| DAROCURE 1173, phr | 6 | 6 |
| PEROXIDE | | |
| LAUROYL PEROXIDE, phr | 1 | — |
| VISCOSITY (cps) | | |
| 0 HRS | 1000 | 400 |
| 8 HRS | 1050 | 700 |
| THERMAL DATA | | |
| $T_g$ (°C.) | 191 | 190 |

*DPEMPA is Dipentaerythritol monohydroxy pentaacrylate;
ETMPTA is Ethoxylated trimethylolpropane triacrylate.

Table 1 illustrates a resin composition in accordance with the invention (Composition 1) and a composition similar thereto but lacking a peroxide (Composition 2). The data indicate that the resin compositions of the invention provide substantially equivalent pot-life and glass transition temperature when compared to conventional cyanate ester dual curing compositions. It may also be noted that the $T_g$ of the resins is believed to be unaffected by the acrylate component, but rather is controlled by the cyanate ester-epoxy polymerization.

TABLE 2

| MATERIALS | COMPOSITIONS | | |
|---|---|---|---|
| | 3 | 4 | 5 |
| EPOXY | | | |
| EPON 825, phr | 100 | 100 | 100 |
| CYANATE ESTER | | | |
| AROCY B-30, phr | 100 | 100 | 100 |
| NONYL PHENOL, phr | 3.0 | 3.0 | 3.0 |
| Sn(II) ETHYL HEXANOATE, phr | 0.2 | 0.2 | 0.2 |
| ACRYLATE | | | |
| NEOPENTYL GLYCOL DIACRYLATE, phr | 60 | 60 | 60 |
| DAROCURE 1173, phr | 8 | 8 | 8 |
| T-BUTYL PERBENZOATE, phr | — | 2 | — |
| LAUROYL PEROXIDE, phr | — | — | 2 |
| ADDITIVES | | | |
| BYK 070, phr | 1.32 | 1.32 | 1.32 |
| FC-430, phr | 0.26 | 0.26 | 0.26 |
| VISCOSITY (cps) | | | |
| INITITAL | 1090 | 1085 | 940 |
| 5 HRS | 1105 | 1100 | 965 |
| 8 HRS | 1160 | 1140 | — |
| 24 HRS | — | — | 995 |
| $T_g$ (°C.) | 179 | 180 | 185 |

TABLE 2-continued

| MATERIALS | COMPOSITIONS | | |
|---|---|---|---|
| | 3 | 4 | 5 |
| WINDING CONDITIONS | | | |
| FIBER | GRAPHITE | GRAPHITE | GRAPHITE |
| SPEED (IN./SEC.) | 12 | 12 | 12 |
| LIGHT INTENSITY (MW/CM) | 425 | 425 | 425 |
| WINDING RESULTS | | | |
| DRIP (Y/N) | YES | YES | NO |
| WT. % RESIN LOSS AFTER HEAT CURE | 6.4 | 1.2 | 0 |

In this Example, three cyanate ester compositions were used to prepare filament wound articles according to the methods described elsewhere herein. The results of this comparison are illustrated in Table 2. The comparison of compositions 3, 4, and 5 focuses on the function of peroxide in imparting resistance of the compositions to drip during the heat cure phase of the filament winding cure process. Composition 3 employed no peroxide and produced significant drip on heat cure, with a resin loss from the wound article of about 6.4%. Composition 4 employed t-butylperbenzoate, a peroxide having a 10 hour decomposition half life at about 104° C., i.e., a temperature outside of the range of temperatures of peroxides useful for the invention. Composition 4 dripped significantly on heat cure, producing a loss of resin from the filament wound article of about 1.2%. Composition 5 was a composition employing a peroxide selected from the class of peroxides useful for the present invention, lauroyl peroxide, having a 10 hour decomposition half life at 64° C. Composition 5 is therefore representative of the compositions of the present invention. It is shown in Table 2 that composition 5 produced no dripping on heat cure. Furthermore, no loss of resin from the filament wound article was observed. It will also be noted that the lauroyl peroxide improved the glass transition temperature of the resin composition to 185° C. compared to 179° C. and 180° C. for compositions 3 and 4, respectively.

While the invention has been described with reference to specific embodiments, it will be apparent that numerous variations, modifications, and alternative embodiments are possible, and, accordingly, all such variations, modifications, and alternative embodiments are to be regarded as being within the spirit and scope of the present invention.

What is claimed is:

1. A one-part dual curing filament winding composition having a stable shelf-life comprising a. an epoxy component including at least one polyepoxide resin curable by heat;

b. an olefinically unsaturated monomer component including at least one polyolefinically unsaturated monomer curable by actinic radiation;

c. at least one cyanate ester;

d. at least one photoinitiator;

e. at least one organic peroxide for said olefinically unsaturated monomer component which is substantially unreactive in the presence of actinic radiation and in the absence of a photosensitizer, said peroxide having a 10 hour decomposition half-life temperature of from about 50° C. to less than about 104° C.;

f. at least one heat activated curing agent for accelerating reaction of said cyanate ester, said heat activated curing agent being selected from the group consisting of organo-metal compounds, inorganic metal salts, phenolic compounds, solutions of organo-metal compounds in phenolic compounds and mixtures thereof;

and wherein said composition is capable of being immobilized with actinic radiation and further heat cured without substantial resin drop to produce a $T_g$ of at least about 150° C.

2. The composition of claim 1 wherein the organic peroxide is selected from the group consisting diacylperoxides, peroxydicarbonates, peroxyesters, peroxyketals, and mixtures thereof.

3. The composition of claim 2 wherein the organic peroxide is selected from the group consisting of lauroyl peroxide, t-amylperoxy-2-ethylhexanoate, 1,1-di(t-butylperoxy)- 3,3,5-trimethylhexane, and mixtures thereof.

4. The composition of claim 1 wherein the organic peroxide is included in an amount of from about 0.2 wt. % to about 2 wt. %.

5. The composition of claim 4 wherein the organic peroxide is included in an amount of from about 0.5 wt. % to about 1.5 wt. %.

6. The composition of claim 1 wherein the polyepoxide resin is selected from the group consisting of polyglycidyl and poly(β-methylglycidyl)ethers of dihydric and polyhydric alcohols and phenols, novolaks, alkyl-substituted phenols and halogen-substituted phenols, poly(N-glycidyl) compounds obtained from amines containing at least two amino-hydrogen atoms, triglycidylisocyanurate, N,N'-diglycidyl derivatives of cyclic alkaline ureas and hydantoins, poly(S-glycidyl) derivatives of dithiols, and mixtures thereof.

7. The composition of claim 6 wherein the polyepoxide resin is selected from the group consisting of diglycidyl ethers of bisphenols.

8. The composition of claim 1 wherein the epoxy component is included in an amount of from about 25 wt. % to about 50 wt. %.

9. The composition of claim 8 wherein the epoxy component is included in an amount of from about 30 wt. % to about 40 wt. %.

10. The composition of claim 1 wherein the cyanate ester is selected from the group consisting of monomeric, oligomeric and polymeric cyanate ester compounds having at least two —OCN functional groups and having a cyanate equivalent weight from of about 50 to about 500.

11. The composition of claim 10 wherein the cyanate ester is sleected from the group consisting of dicyanate esters of bisphenol A, dicyanate esters of tetramethyl bisphenol F, dicyanate esters of bisphenol E, dicyanate oligomers of bisphenol A, polycyanate esters of dicyclopentadiene phenol copolymers, and mixtures thereof.

12. The composition of claim 1 wherein the cyanate ester is included in an amount of from about 25 wt. % to about 50 wt. %.

13. The composition of claim 12 wherein the cyanate ester is included in an amount of from about 30 wt. % to about 40 wt. %.

14. The composition of claim 1 wherein the polyolefinically unsaturated monomer is selected from the group consisting of acrylic and methacrylic resins, vinyl monomers, unsaturated polyesters solubilized in vinyl monomers, and mixtures thereof.

15. The composition of claim 14 wherein the polyolefinically unsaturated monomer is selected from the group consisting of trimethylolopropane trimethacrylate, trimethylolpropane triacrylate, dipentaerythritol monohydroxypentaacrylate, pentaerythritol triacrylate, ethoxylated trimethylolpropane triacrylate, 1,6-hexanediol diacrylate, neopentyl glycol diacrylate, pentaerythritol tetraacrylate, 1,3-butylene glycol diacrylate, and mixtures thereof.

16. The composition of claim 1 wherein the polyolefinically unsaturated monomer is included in an amount of from about 5 wt. % to about 30 wt. %.

17. The composition of claim 16 wherein the polyolefinically unsaturated monomer is included in an amount of from about 15 wt. % to about 25 wt. %.

18. The composition of claim 1 wherein the photoinitiator is selected from the group consisting of benzophenone and substituted benzophenones, acetophenone and substituted acetophenones, benzoin and its alkylethers, xanthone and substituted xanthones, camphoroquinone peroxyesters, 9-fluorene carboxylic acid peroxyesters, and mixtures thereof.

19. The composition of claim 18 wherein the photoinitiator is selected from the group consisting of 2-hydroxy-2-methyl-1-phenyl-propan-1-one, 2-benzyl-2 -(dimethylamino)-1-[4-(4-morpholinyl)phenyl]-1-butanone, and mixtures thereof.

20. The composition of claim 1 wherein the photoinitiator is included in an amount of from about 1 wt. % to about 10 wt. %.

21. The composition of claim 20 wherein the photoinitiator is included in an amount of from about 2 wt. % to about 5 wt. %.

22. The composition of claim 1 wherein the heat activated curing agent comprises a solution of an organo-metal component, including at least one organo-metal compound, in a phenolic component, including at least one phenolic compound.

23. The composition of claim 22 wherein the organo-metal compound is selected from the group consisting of copper(II) acetylacetonate, copper(II) naphthenate, cobalt(II) acetylacetonate, zinc(II) naphthenate, zinc(II) ethylhexanoate, maganese(II) naphthenate, cyclopentadienyl iron(II) dicarbonyl dimer, titanium bis(ethyl-3-oxobutanolato-O$^1$, O$^3$) bis(2-propanolato), dibutyltin(IV) dilaurate, and mixtures thereof.

24. The composition of claim 22 wherein the organo-metal component is included in an amount of from about 0.01 wt. % to about 1.0 wt. %.

25. The composition of claim 22 wherein the organo-metal component is included in an amount of from about 0.05 wt. % to about 0.2 wt. %.

26. The composition of claim 22 wherein the phenolic compound is selected from the group consisting of phenol, nonyl phenol, bisphenol A, cresol, catechol, and mixtures thereof.

27. The composition of claim 22 wherein the phenolic component is included in an amount of from about 0.1 wt. % to about 10.0 wt. %.

28. The composition of claim 22 wherein the phenolic component is included in an amount of from about 0.5 wt. % to about 1.5 wt. %.

29. The composition of claim 22 wherein the heat activated curing agent comprises copper(II) naphthenate in nonyl phenol.

30. A filament-winding composition comprising an epoxy component present in an amount of from about 25 wt. % to about 50 wt. %; a polyolefinically unsaturated monomer present in an amount of from about 5 wt. % to about 30 wt. %; a cyanate ester present in an amount of from about 25 wt. % to about 50 wt. %; a photoinitiator present in an amount of from about 1 wt. % to about 10 wt. %; an organic peroxide present in an amount of from about 0.2 wt. % to about 2 wt. %, said peroxide having a 10 hour decomposition half-life temperature of from about 50° C. to less than about 104° C.; a heat activated curing agent for the cyanate ester component present in an amount of from about 0.01 wt. % to about 6 wt. %, said heat activated curing agent being selected from th group consisting of organometal compounds, inorganic metal salts, phenolic compounds, solutions of organo-metal compounds in phenolic compounds and mixtures thereof; and wherein said composition has a viscosity of about 2000 centipoise or less and is capable of retaining said viscosity for at least about 6 months at about ambient temperature, and wherein said composition is capable of being immobilized with actinic radiation and further heat-cured without substantial resin drip.

* * * * *